United States Patent [19]

Loftus et al.

[11] Patent Number: 5,529,596
[45] Date of Patent: Jun. 25, 1996

[54] METHOD FOR MAKING DUAL-GLASS FIBERS BY CAUSING ONE GLASS TO FLOW AROUND ANOTHER GLASS AS THEY ARE SPUN FROM A ROTATING SPINNER

[75] Inventors: James E. Loftus; Carl R. Strauss; Robert L. Houston, all of Newark, Ohio

[73] Assignee: Owens-Corning Fiberglas Technology, Inc., Summit, Ill.

[21] Appl. No.: 236,070

[22] Filed: May 2, 1994

[51] Int. Cl.$^6$ .................................................. C03B 37/04
[52] U.S. Cl. ................. 65/438; 428/370; 425/DIG. 217; 65/444; 65/470; 65/502; 65/145
[58] Field of Search ............................. 65/437, 438, 444, 65/470, 502, 405, 495, 145; 428/370, 371; 425/DIG. 217

[56] References Cited

U.S. PATENT DOCUMENTS

| | | | |
|---|---|---|---|
| 2,331,945 | 10/1945 | Pazsiczky | 425/DIG. 217 |
| 2,900,708 | 8/1959 | Pond | 65/502 |
| 2,927,621 | 3/1960 | Slayter et al. | |
| 2,998,620 | 9/1961 | Stalego | 65/430 |
| 3,016,599 | 1/1962 | Perry, Jr. | |
| 3,073,005 | 1/1963 | Tiede | |
| 3,192,023 | 6/1965 | Stalego | 65/444 |
| 3,197,813 | 8/1965 | LeGrand | |
| 3,274,324 | 9/1966 | Stalego | 65/405 |
| 3,511,747 | 5/1970 | Davies | |
| 3,841,882 | 10/1974 | Wolf | |
| 3,924,927 | 12/1975 | Wolf | |
| 4,460,696 | 7/1984 | Harada et al. | 501/37 |
| 4,482,205 | 11/1984 | Lagakos et al. | |
| 4,913,518 | 4/1990 | Fine | |
| 5,057,168 | 10/1991 | Muncrief | |

OTHER PUBLICATIONS

"The Science Of Fibre Spinning and Drawing", Fundamentals of Fibre Formation, by Andrzej Ziabicki, John Wiley & Sons, pp. 366–373 and 386–388.

Primary Examiner—David A. Simmons
Assistant Examiner—John Hoffmann
Attorney, Agent, or Firm—C. Michael Gegenheimer; Ted C. Gillespie

[57] ABSTRACT

A method for making dual-glass fibers includes supplying first and second molten glass to a rotating spinner having an orificed peripheral wall, where the first glass has a higher viscosity than that of the second glass, centrifuging the first and second glasses through the orifices as molten dual-glass streams, maintaining the dual-glass streams at a temperature sufficient to enable the second glass to flow around the first glass, and cooling the dual-glass streams to make dual-glass fibers.

17 Claims, 6 Drawing Sheets

METHOD FOR MAKING DUAL-GLASS FIBERS BY CAUSING ONE GLASS TO FLOW AROUND ANOTHER GLASS AS THEY ARE SPUN FROM A ROTATING SPINNER

Be it known that we JAMES E. LOFTUS, a citizen of the United States of America, resident of Newark, County of Licking, State of Ohio, CARL R. STRAUSS, a citizen of. the United States of America, resident of Newark, and ROBERT L. HOUSTON, a citizen of the United States of America, resident of Newark, have invented a new and useful improvement in a METHOD FOR MAKING DUAL-GLASS FIBERS by causing one glass to flow around another glass as they are spun from a rotating spinner, which invention is fully set forth in the following specification.

TECHNICAL FIELD

This invention relates to the manufacture of dual-glass fibers having two glasses of different composition. More particularly, this invention pertains to the manufacture of molten dual-glass streams under conditions in which one of the glasses reacts differently to the fiber forming environment than the other glass.

BACKGROUND OF THE INVENTION

Recent developments in the art of manufacturing glass fibers have resulted in new methods for making irregularly shaped glass fibers comprising two distinct glass compositions with different coefficients of thermal expansion. The difference in coefficient of thermal expansion between the two glasses enables the resulting glass fiber to have an irregular shape, thereby providing numerous attributes to the glass fiber which enhance the performance of products made with those fibers. Some of those product enhancements include increased entanglement among the fibers, increased recovery of insulation products made by the fibers, lower K values, lower irritability upon handling, and a more uniform volume filling nature.

Dual-glass fibers disclosed in the art so far were comprised of glasses that have generally similar viscosities and softening points. For example, in U.S. Pat. No. 2,998,620, to Stalego, the differences in viscosities and softening points of the four glass compositions disclosed are relatively minor. Since the viscosities and softening points of the two glasses of the dual-glass fibers of the prior art are relatively similar, the two glasses will react similarly to the fiber forming conditions encountered by the dual-glass stream as it forms into a solid dual-glass fiber. It would be advantageous to make a dual-glass fiber from a molten dual-glass stream where there are differences in the viscosity and/or the softening point of the two glasses in order to enable the two glasses to exhibit differing reactions to the fiber forming environment.

SUMMARY OF THE INVENTION

There has now been developed a method for producing dual-glass fibers in which the first glass of the two glasses has a higher viscosity than that of the second glass so that the two glasses can react differently to the fiber forming environment, thereby affecting the shape of the dual-glass fiber, the internal constitution of the dual-glass fiber, and/or the properties of the dual-glass fiber.

According to this invention, there is provided a method for making dual-glass fibers comprising supplying first and second molten glasses to a rotating spinner having an orificed peripheral wall, where the first glass has a higher viscosity than that of the second glass, centrifuging the first and second glasses through the orifices as molten dual-glass streams, maintaining the dual-glass streams at a temperature sufficient to enable the second glass to flow around the first glass, and cooling the dual-glass streams to make dual-glass fibers.

In a specific embodiment of the invention, the viscosity of the first glass, at the temperature of the spinner wall, is higher than that of the second glass by a factor within the range of from about 5 to about 1000. More preferably, the viscosities differ by a factor within the range of from about 50 to about 500. For example, the second glass (glass B) might have a viscosity at the spinner wall temperature (1037° C.) of 100 poise, while the first glass (glass A) has a viscosity of 100,000 poise at the same temperature. It is to be understood that the viscosity measurements as used in this specification are to be taken at the temperature of the spinner peripheral wall.

In a particular embodiment of the invention, the lower viscosity second glass flows all the way around the first glass so that the second glass encloses the first glass to form a cladding.

In yet another embodiment of the invention, the softening point of the second glass is lower than the softening point of the first glass by at least 50° C. Preferably, the difference in softening point is at least 100° C.

The dual-glass fibers from glasses having differing softening points can be collected as a wool pack and subjected to a temperature greater than the softening point of the second glass but less than the softening point of the first glass. This will enable the second glass to soften, thereby causing the dual-glass fibers to bond to each other upon cooling. The result will be that the second glass acts as a binder material for the first glass fibers in the wool pack.

By making a glass fiber insulation product from dual-glass fibers having glasses with different softening points and passing the product through an oven to heat the lower softening point glass to act as a binder, the insulation product can be produced without using an organic binder. This method, then, enables the production of glass fiber insulation products while avoiding the environmental problems associated with organic binders. This may be particularly useful where one desires higher densities and the advantages of having the lower temperature glass to shape the pack into a rectangular parallelepiped.

In yet another embodiment of the invention, there is provided a method for making dual-glass fibers comprising supplying first and second molten glasses to a textile bushing, where the first glass has a viscosity higher than that of the second glass by a factor within the range of from about 50 to about 500, drawing the first and second glasses from the bushing as molten dual glass streams, maintaining the dual glass streams at a temperature sufficient to enable the second glass to flow around the first glass, and cooling the dual-glass streams to make dual-glass fibers.

In another embodiment of the invention the flowing of the second glass around the first glass is effected by making the surface tension of the second glass higher than that of the first glass. Then, as long as the temperature is maintained high enough and long enough, the second glass will flow around the first glass. The use of two glasses having different surface tensions can be used alone or in conjunction with the use of two glasses having different viscosities.

DETAILED DESCRIPTION OF THE PREFERRED EMBODIMENTS

As used in this specification, the term "glass" includes glassy forms of other mineral materials, such as rock, slag and basalt.

Figure 1:
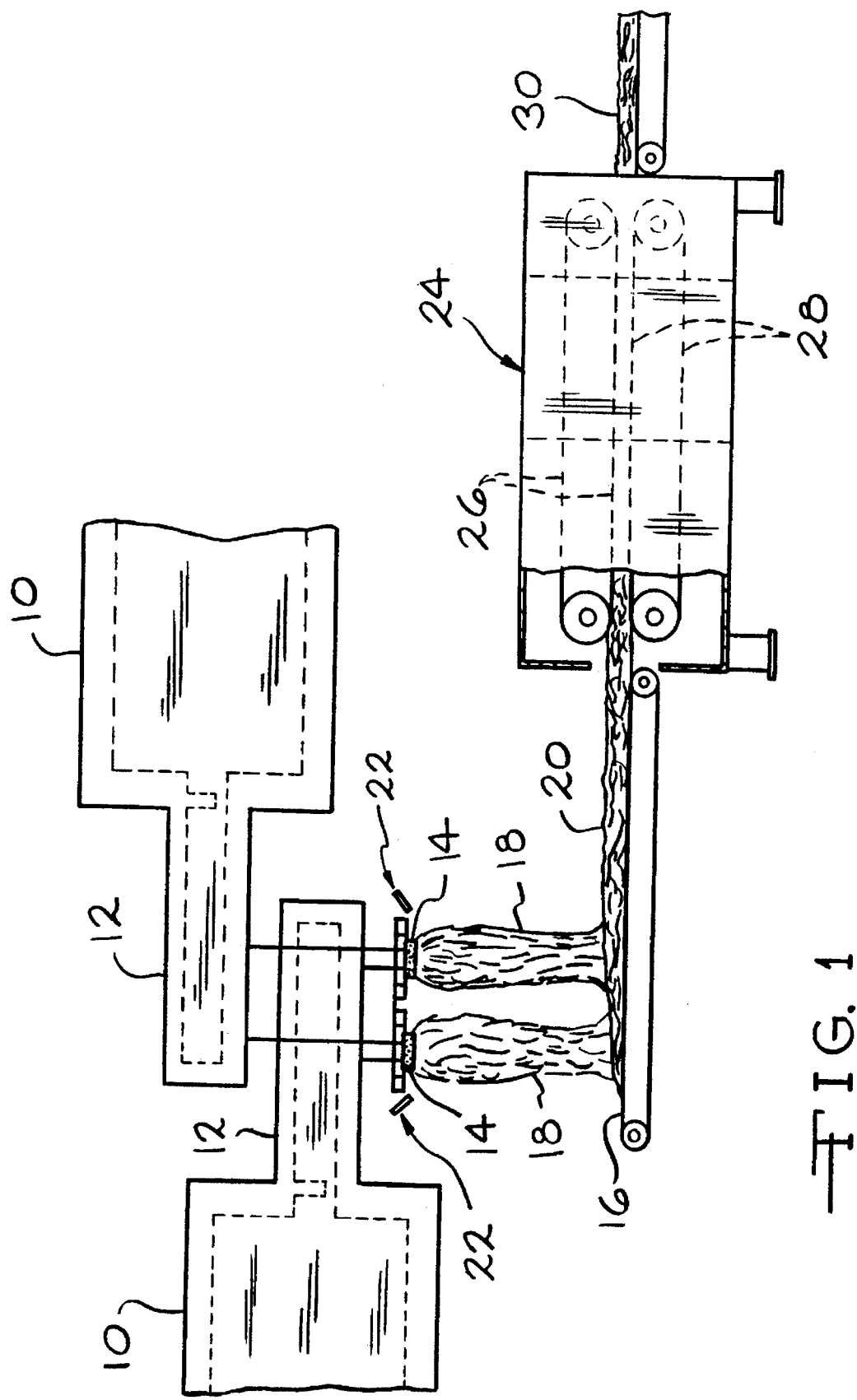
FIG. 1 is a schematic view in elevation of apparatus for carrying out the method of making dual-glass fibers by the rotary process.

Referring to FIG. 1, it can be seen that two distinct molten glass compositions are supplied from furnaces 10 via forehearths 12 to fiberizers 14. Veils 18 of irregularly-shaped glass fibers produced by the fiberizers are collected on conveyor 16 as wool pack 20 by means of a partial vacuum positioned beneath the conveyor. As the fibers are blown downward by air or gases to the conveyor by means of blowers 22 in the fiberizers, they are attenuated and assume their irregular shape.

Where the method employs a second glass having a softening point lower than the softening point of the first glass so that the second glass can act as a binder or solder material, the wool pack can be passed through an oven or other heating means, such as oven 24, to soften the lower temperature glass and thereby bind the higher temperature glass. While passing through the oven, the wool pack is shaped by top conveyor 26 and bottom conveyor 28, and by edge guides, not shown. While in the oven, the glass fibers may be subjected to flows of hot gases to facilitate uniform heating. The wool pack then exits the oven as insulation product 30.

Figure 2:
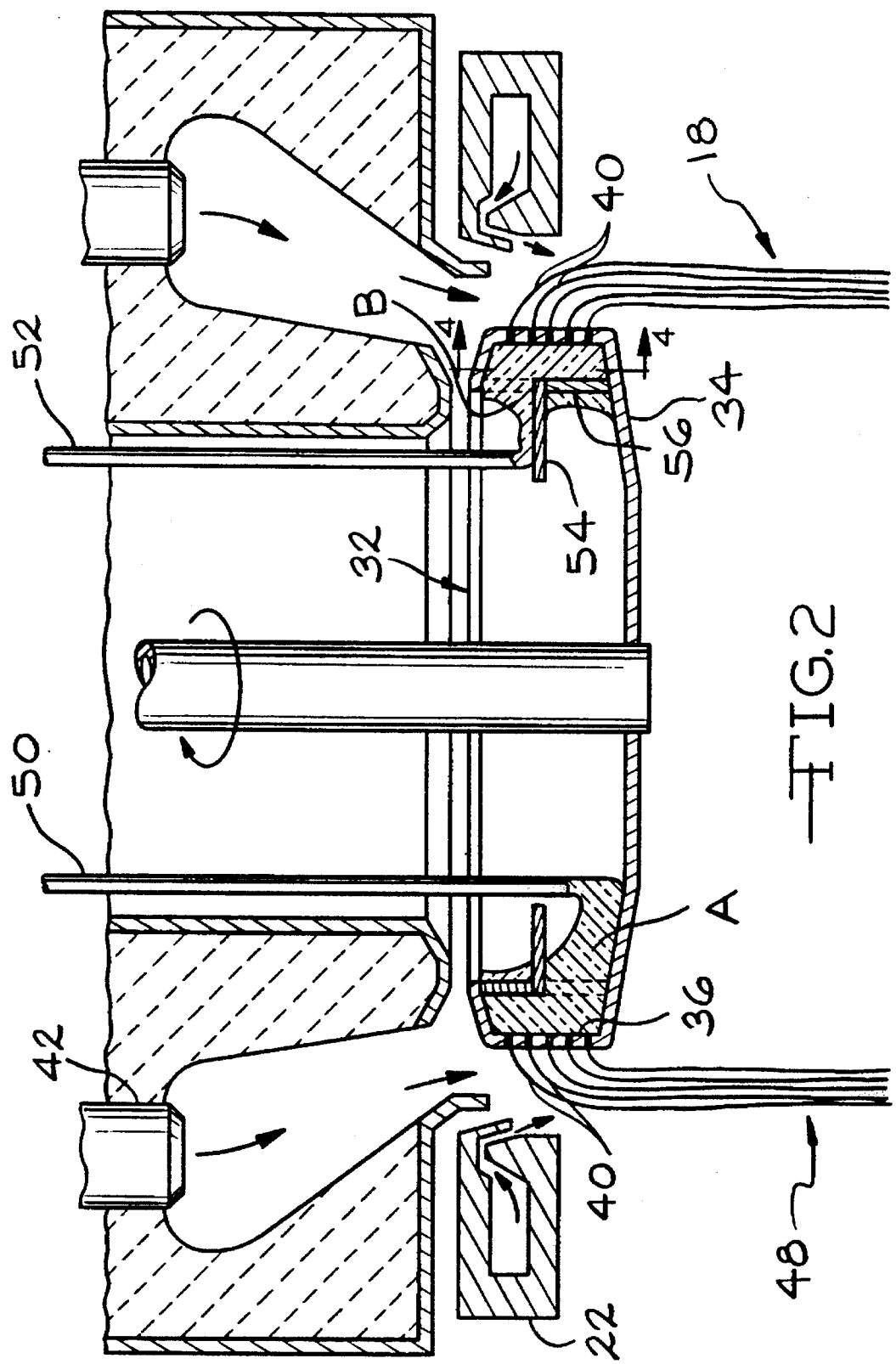
FIG. 2 is a cross-sectional view in elevation of a rotary fiberizer by which dual-glass fibers can be produced according to the invention.

As shown in FIG. 2, spinner 32 is comprised of spinner bottom wall 34 and spinner peripheral wall 36. The rotation of the spinner centrifuges molten glass through the spinner peripheral wall into primary fibers 40. In one embodiment of the invention, the primary fibers are maintained in a soft, attenuable condition by the heat of annular burner 42. In another embodiment of the invention, an internal burner, not shown, provides heat to the interior of the spinner. The annular blower pulls the primary fibers and further attenuates them into a veil of secondary fibers 48, suitable for use in wool insulating materials. Optionally, a binder can be applied to the fibers. The secondary fibers, or dual-glass irregularly-shaped glass fibers, are then collected for formation into a wool pack.

The interior of the spinner is supplied with two separate streams of molten glass, first stream 50 containing glass A and second stream 52 containing glass B. The glass in stream 50 drops directly onto the spinner bottom wall and flows outwardly by centrifugal force toward the spinner peripheral wall to form a head of glass A. Glass B in molten glass stream 52 is positioned closer to the spinner peripheral wall than stream 50, and the glass in stream 52 is intercepted by horizontal flange 54 before reaching the spinner bottom wall. Thus, a build-up or head of glass B is formed above the horizontal flange.

Figure 3:
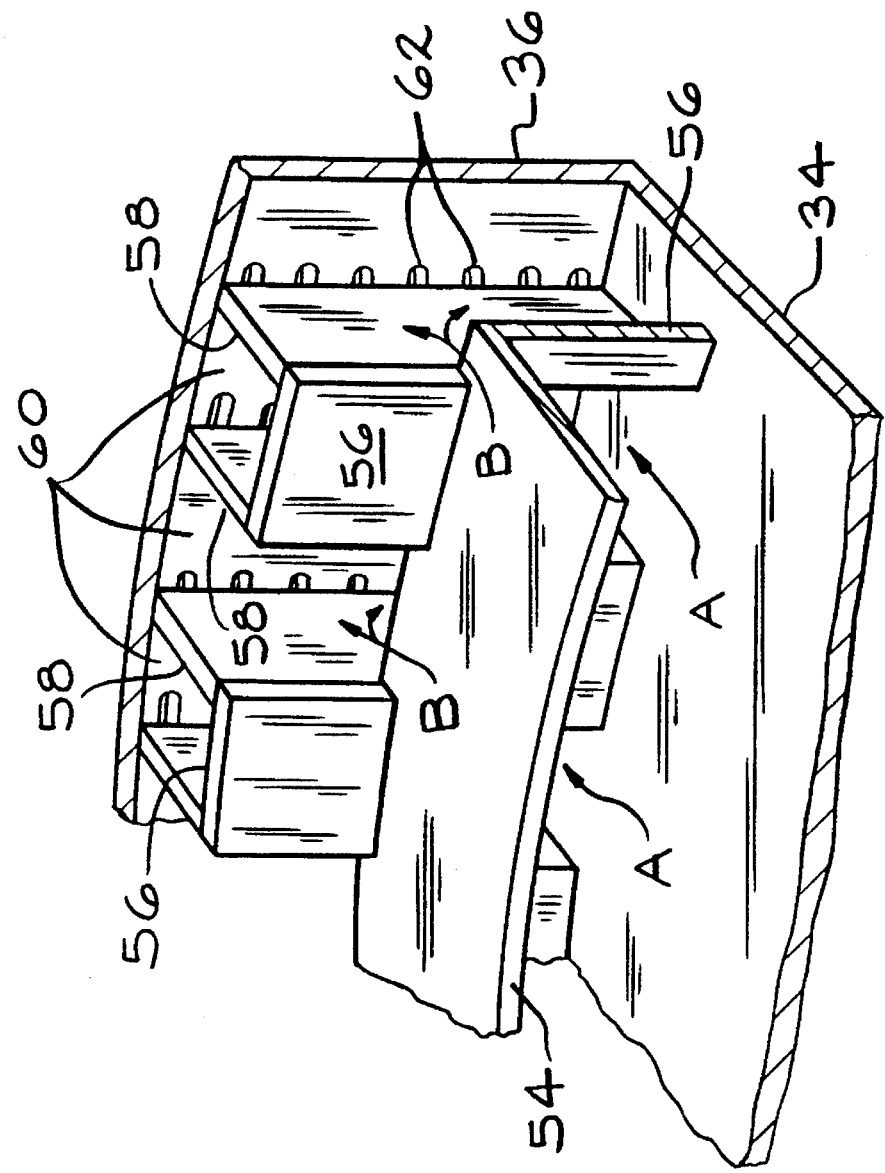
FIG. 3 is a schematic view in perspective of a portion of the spinner of FIG. 2.

As shown in FIG. 3, the spinner is adapted with vertical interior wall 56 which is generally circumferential and positioned radially inwardly from the spinner peripheral wall. A series of vertical baffles 58, positioned between the spinner peripheral wall and the vertical interior wall, divide that space into a series of compartments 60. Alternate compartments contain either glass A or glass B.

The spinner peripheral wall is adapted with orifices 62 which are positioned adjacent the radially outward end of the vertical baffle. The orifices have a width greater than the width of the vertical baffle, thereby enabling a flow of both glass A and glass B to emerge from the orifice as a single dual-glass molten stream of glass.

Figure 4:
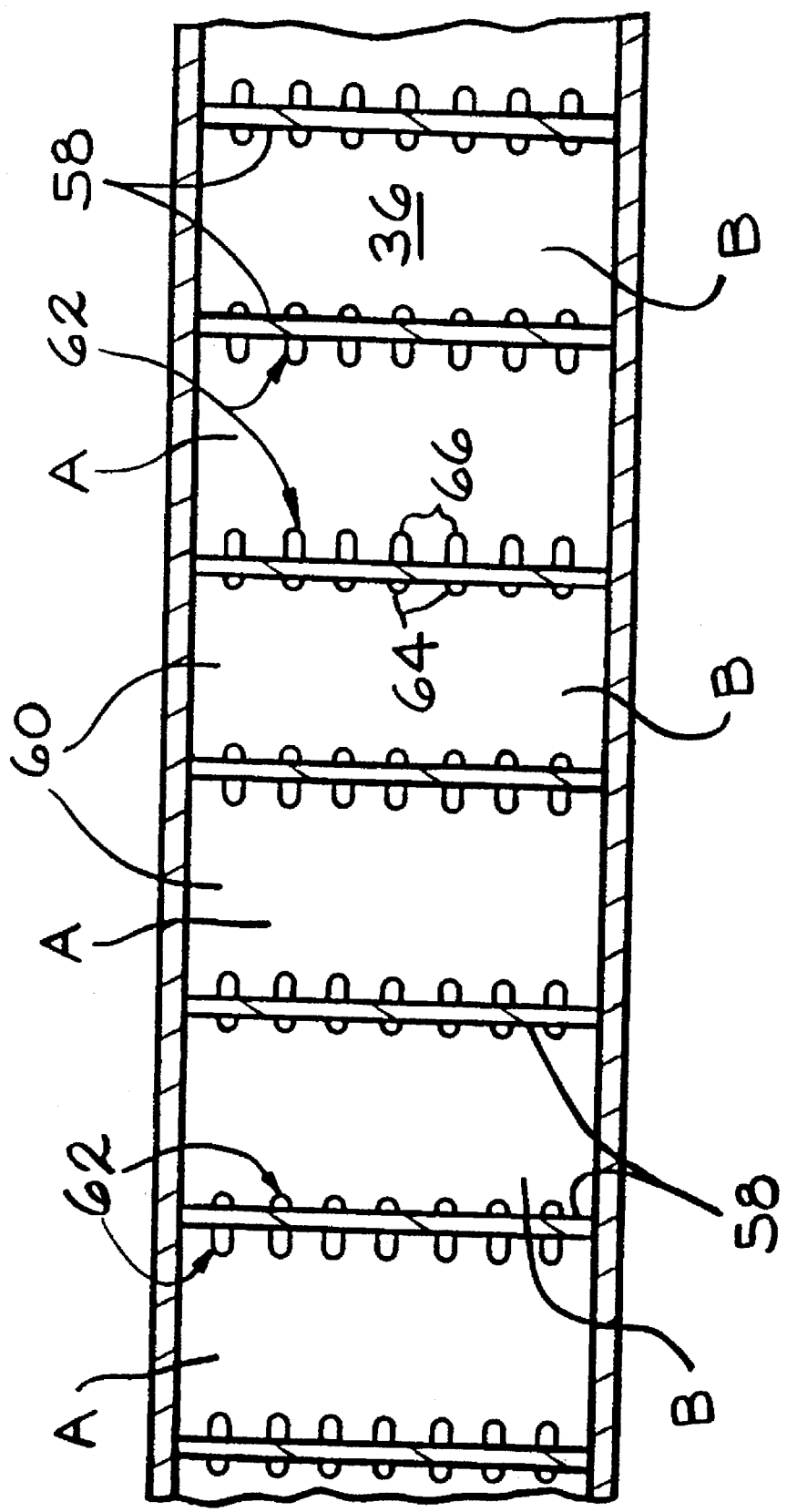
FIG. 4 is a schematic view in elevation of the spinner of FIG. 2, taken along line 4—4.

As can be seen in FIG. 4, each compartment 60 runs the entire height of spinner peripheral wall 36 with orifices along the entire vertical baffle separating the compartments. Other spinner configurations can be used to supply dual streams of glass to the spinner orifices. As shown in FIG. 4, the orifices 62 are in the shape of slots, although other shapes of orifices can be used.

Where the A and B glasses have different viscosities at the temperature of the spinner peripheral wall, an orifice perfectly centered about the vertical baffle 58 would be expected to emit a higher throughput of the lower viscosity glass than the throughput of the higher viscosity glass. In order to counteract this tendency and to balance the throughputs of the two glasses, the slot orifice can be positioned offset from the centerline of the vertical baffle. In such a case, the orifice will have a smaller end such as end 64 which will restrict the flow of the lower viscosity material, and larger end 66 which will enable a comparable flow or throughput of the higher viscosity material. Another method to equalize the flow of the low viscosity glass with the high viscosity glass is to restrict the flow of glass into the alternate compartments containing the low viscosity glass, thereby partially starving the holes so that the throughputs of the A and B glass are roughly equivalent.

The irregularly-shaped fibers of the present invention are dual-glass fibers, i.e. each fiber is composed of two different glass compositions, glass A and glass B. If one were to make a cross-section of an ideal irregularly-shaped glass fiber of the present invention, one half of the fiber would be glass A, with the other half glass B. Cross-section photographs of fibers can be obtained by mounting a bundle of fibers in epoxy with the fibers oriented in parallel as much as possible. The epoxy plug is then cross-sectioned and polished. The polished sample surface is then coated with a thin carbon layer to provide a conductive sample for analysis by scanning electron microscopy (SEM). The sample is then examined on the SEM using a backscattered-electron detector, which displays variations in average atomic number as a variation in the gray scale. This analysis reveals the presence of two glasses by a darker and lighter region on the cross-section of the fiber, and shows the interface of the two glasses.

Figure 5:
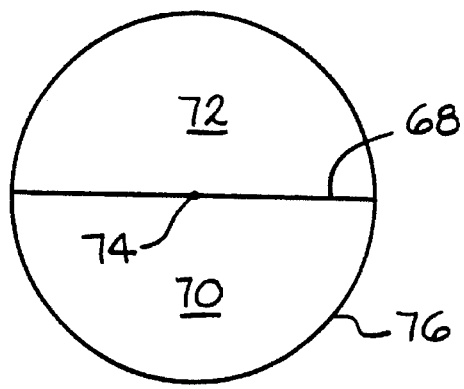
FIG. 5 is a schematic cross-sectional view of a dual-glass fiber comprised of two glasses having generally similar viscosities and softening points.
Figure 6:
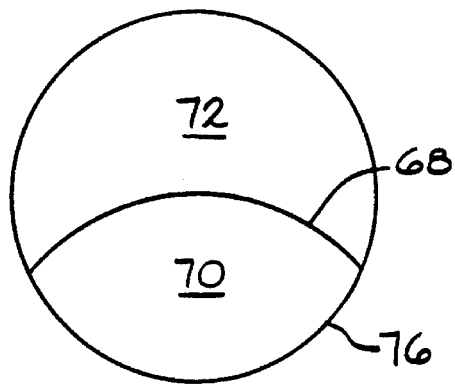
FIG. 6 is a schematic cross sectional view of a dual-glass fiber of the invention in which differing glass viscosities of the two glasses enables the second glass to flow partially around the first glass.

If the A/B ratio is 50:50, the interface 68 between the two glasses, glass A 70 and glass B 72, passes through the center 74 of the fiber cross-section, as shown in FIG. 5. As shown in FIG. 6, where the B glass has a lower viscosity, the B glass can somewhat bend around or wrap around the higher viscosity A glass so that the interface 68 becomes curved. This requires that the dual-glass stream emanating from the spinner be maintained at a temperature sufficient to enable the low viscosity B glass to flow around the higher viscosity A glass. Adjustments in the fiberizer operating parameters, such as burner gas pressure, blower pressure, and spinner temperature, may be necessary to achieve the desired wrap of the low viscosity glass.

Figure 7:
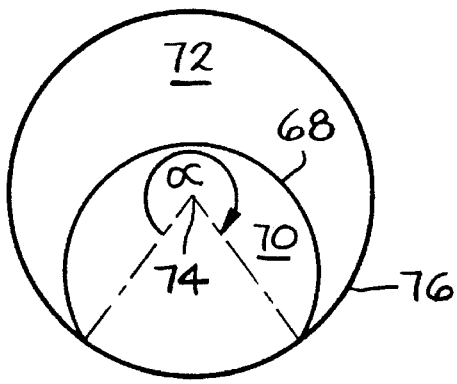
FIG. 7 is a schematic cross-sectional view of a dual-glass fiber of the invention in which the differing glass viscosities enables the lower viscosity second glass to nearly enclose the higher viscosity glass.

As shown in FIG. 7 the lower viscosity B glass has flowed almost all the way around the higher viscosity A glass. One way to quantify the extent to which the lower viscosity glass flows around the higher viscosity glass is to measure the angle of wrap, such as the angle alpha shown in FIG. 7. In some cases the lower viscosity glass flows around the higher viscosity glass to form an angle alpha of at least 270°, i.e., the lower viscosity glass flows around the higher viscosity glass to an extent that at least 270° of the circumferential surface 76 of the dual-glass fiber is made up of the second glass.

Figure 8:
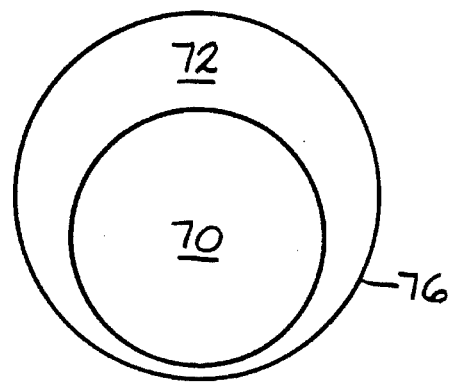
FIG. 8 is a schematic cross-sectional view of a dual-glass fiber of the invention in which the lower viscosity glass flows all the way around the higher viscosity glass to enclose the higher viscosity glass and form a cladding.

As shown in FIG. 8, under certain conditions the second glass can flow all the way around the first glass so that the second glass encloses the first glass to form a cladding. In that case, the entire circumferential surface (360°) of the dual-glass fiber is the second glass or the lower viscosity glass.

Figure 9:
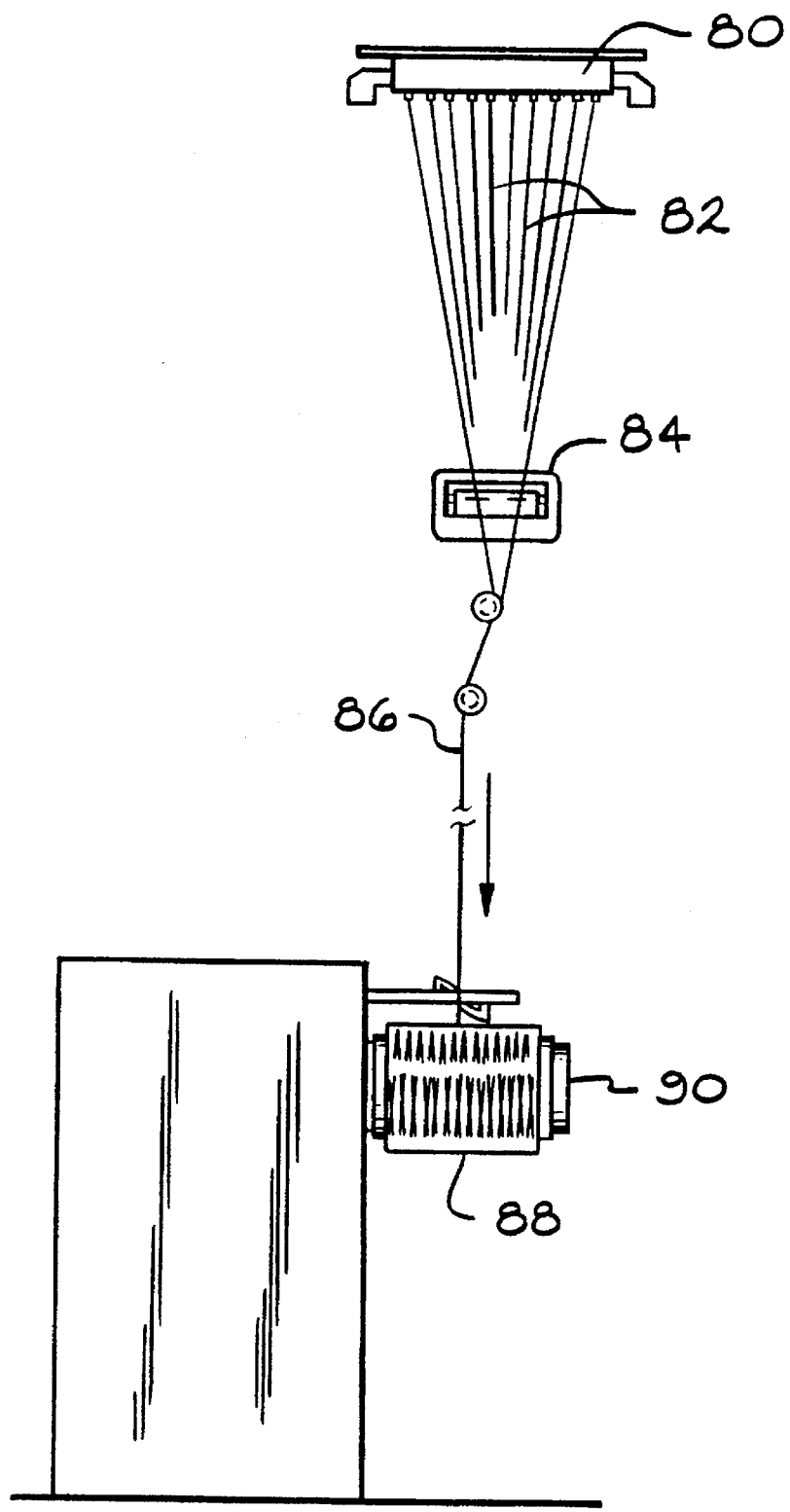
FIG. 9 is a schematic view in elevation of a textile bushing used in a method of making continuous dual-glass fibers according to the invention.

As shown in FIG. 9, the dual-glass fibers can be made according to the method of the present invention using a textile bushing such as bushing 80 and a mechanical or pneumatic pulling force. First and second molten glasses are supplied to the textile bushing where the second glass has a viscosity lower than that of the first glass by a factor within the range of from about 5 to about 1000, and preferably about 50 to about 500. The first and second glasses are drawn from the bushing as molten dual-glass streams, which are maintained at a temperature sufficient to enable the second glass to flow around the first glass. The dual-glass stream is cooled to make dual-glass fibers 82. The fibers can be passed over size applicator 84 and gathered into strand 86 before being wound as package 88 on collet 90. These fibers can be used for any reinforcement or filler purpose.

The method of the invention is not necessarily limited to the use of just two glasses of different viscosities. For example, first, second and third molten glasses can be supplied to a rotating spinner having an orificed peripheral wall. The first, second and third glasses can be centrifuged through the orifices as a molten tri-glass stream, and the tri-glass stream can be maintained at a temperature sufficient to enable one of the lower viscosity glasses to flow around at least one of the other glasses. Upon cooling of the tri-glass stream, a tri-glass fiber will be formed in a manner similar to that of the dual-glass fiber.

The use of two glasses having different surface tensions can also be used to cause the second glass to flow around the first glass. The driving force is the difference between the surface tension of the two glasses. A difference greater than about 20 dynes/cm should be effective to cause one glass to flow around another, assuming the glasses have the same viscosity and assuming the process is carried out under conditions allowing sufficient heat for sufficient duration for the one glass to flow around the other. The fiber forming conditions may enable the flow around effect with even smaller differences in surface tension, or may require greater differences. Surface tension can be measured by a dipping cylinder method, based on a calculation of the force required to pull a small platinum cylinder of known diameter and wall thickness from the surface of molten glass, as described in "Modification of the Dipping Cylinder Method of Measuring Surface Tension" Ralph L. Tiede, "The American Ceramic Society Bulletin", Vol. 51 No. 6, June, 1972.

It will be evident from the foregoing that various modifications can be made to this invention. Such, however, are considered as being within the scope of the invention.

INDUSTRIAL APPLICABILITY

This invention will be found to be useful in the manufacture of glass fibers for use in insulation products.

We claim:

1. The method for making dual-glass fibers comprising supplying first and second molten glasses to a rotating spinner having an orificed peripheral wall, where the first glass has a higher viscosity than that of the second glass, centrifuging the first and second glasses through the orifices as molten dual glass streams, maintaining the dual glass streams at a temperature sufficient to enable the second glass to flow around the first glass, and cooling the dual-glass streams to make dual-glass fibers.

2. The method of claim 1 in which the viscosity of the first glass, at the temperature of the spinner wall, is higher than that of the second glass by a factor within the range of from about 5 to about 1000.

3. The method of claim 2 in which the viscosity of the first glass is higher than that of the second glass by a factor within the range of from about 50 to about 500.

4. The method of claim 1 in which the second glass flows around the first glass to such an extent that at least 270° of the circumference of the dual-glass fiber is the second glass.

5. The method of claim 4 in which the second glass flows all the way around the first glass so that the second glass encloses the first glass to form a cladding.

6. The method of claim 5 in which the viscosity of the first glass, at the temperature of the spinner wall, is higher than that of the second glass by a factor within the range of from about 5 to about 1000.

7. The method of claim 6 in which the viscosity of the first glass is higher than that of the second glass by a factor within the range of from about 50 to about 500.

8. The method of claim 1 in which the softening point of the second glass is lower than the softening point of the first glass by at least 50° C.

9. The method of claim 8 including the steps of collecting the dual-glass fibers as a wool pack and subjecting the wool pack to a temperature greater than the softening point of the second glass but less than the softening point of the first glass.

10. The method of claim 8 in which the softening point of the second glass is lower than the softening point of the first glass by at least 100° C.

11. The method of claim 1 in which the orifice opening for the first glass is larger than the orifice opening of the second glass in order to balance the throughput of the two glasses.

12. The method for making dual-glass fibers comprising supplying first and second molten glasses to a rotating spinner having an orificed peripheral wall, where the softening point of the second glass is lower than the softening point of the first glass by at least 50° C., centrifuging the first and second glasses through the orifices as molten dual-glass streams, maintaining the dual-glass streams at a temperature sufficient to enable the second glass to flow around the first glass, and cooling the dual-glass stream to make dual-glass fibers.

13. The method of claim 12 in which the first glass has a viscosity higher than that of the second glass by a factor within the range of from about 50 to about 500.

14. The method of claim 13 in which the second glass flows all the way around the first glass so that the second glass encloses the first glass to form a cladding.

15. The method of claim 12 including the steps of collecting the dual-glass fibers as a wool pack and subjecting the wool pack to a temperature greater than the softening point of the second glass but less than the softening point of the first glass.

16. The method for making dual-glass fibers comprising supplying first and second molten glasses to a rotating spinner having a peripheral wall and a plurality of baffles defining a series of compartments positioned at the peripheral wall, where the first glass has a higher viscosity than that of the second glass, directing the first and second glasses into alternate compartments so that adjacent compartments contain different glasses, providing orifices in the peripheral wall, the orifices having a width greater than the width of the baffles, thereby enabling a flow of both the first and second glasses through the orifices, where the orifice is positioned offset from the centerline of the baffle, with the smaller ends of the orifices in contact with the compartments containing the lower viscosity second glass, and centrifuging the first and second glasses through the orifices as molten dual glass streams.

17. The method for making dual-glass fibers comprising supplying first and second molten glasses to a rotating spinner having an orificed peripheral wall, where the first glass has a lower surface tension than that of the second glass, centrifuging the first and second glasses through the orifices as molten dual glass streams, maintaining the dual glass streams at a temperature sufficient to enable the second glass to flow around the first glass, and cooling the dual-glass streams to make dual-glass fibers.

\* \* \* \* \*